G. A. LEITZMAN.
RESILIENT WHEEL.
APPLICATION FILED JULY 25, 1912.
1,077,612.
Patented Nov. 4, 1913.
2 SHEETS—SHEET 2.
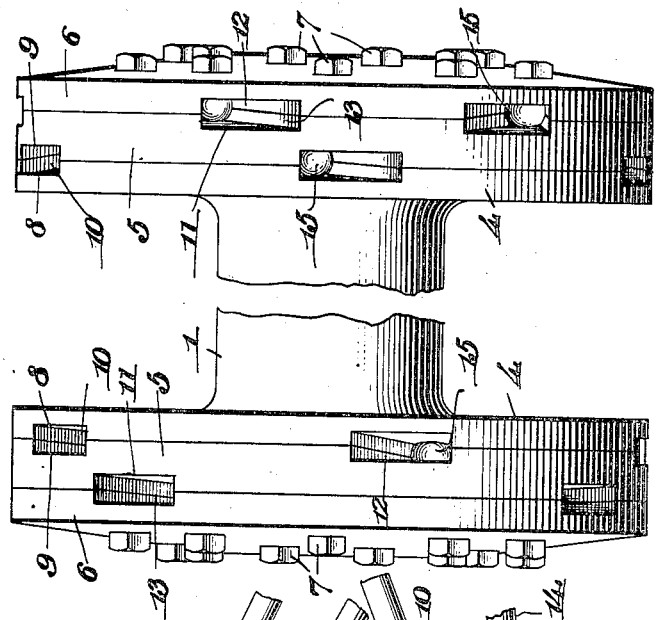
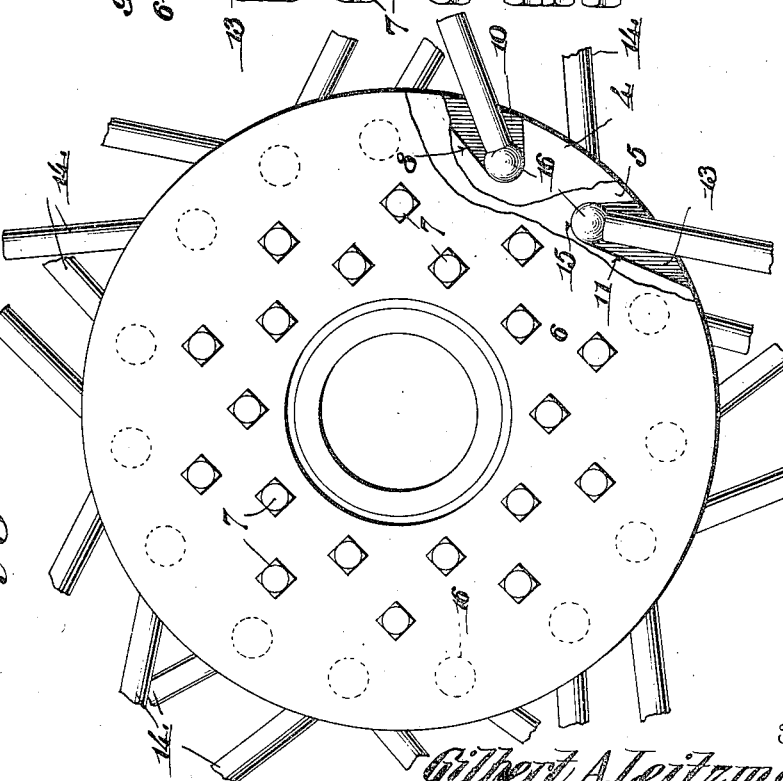

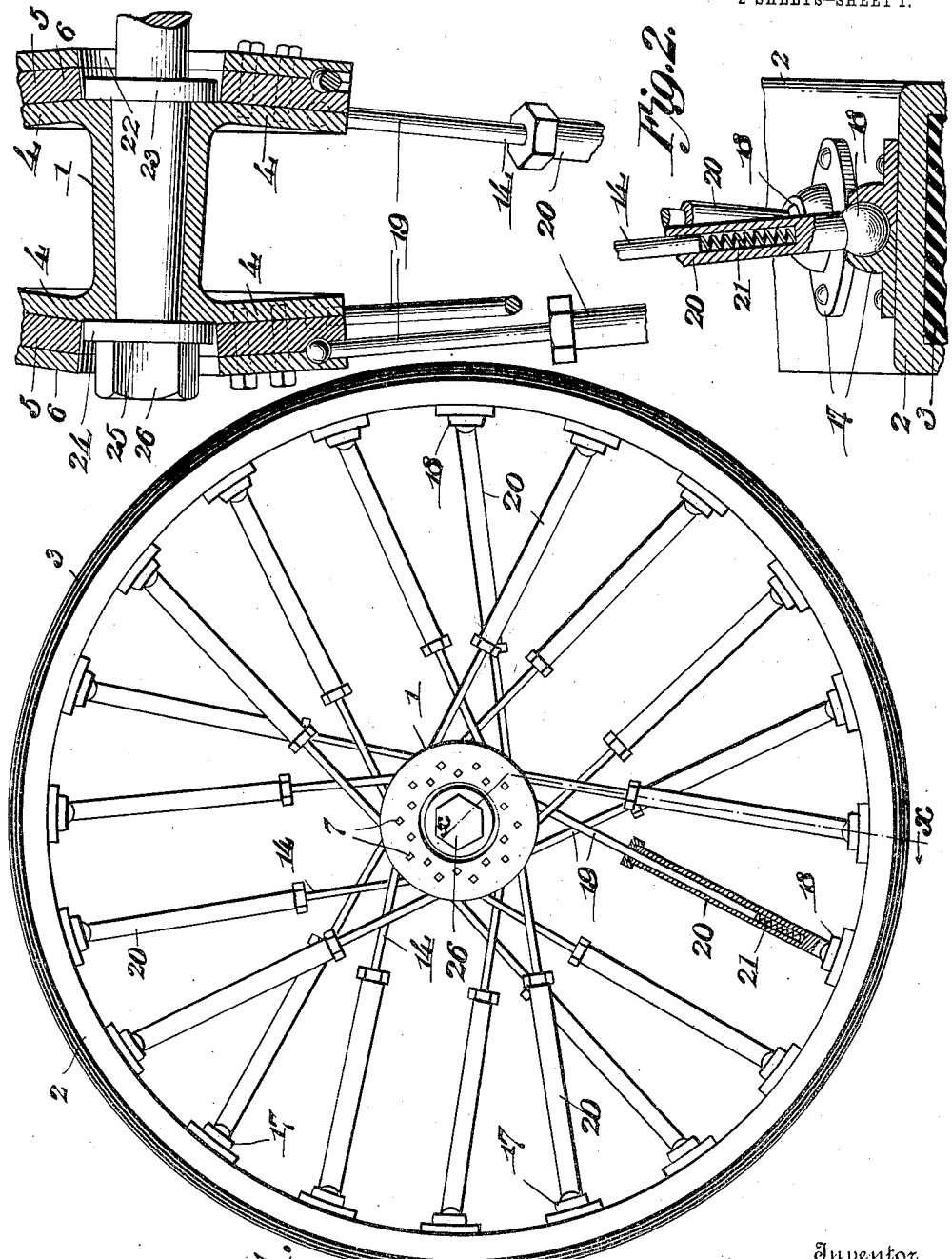

UNITED STATES PATENT OFFICE.

GILBERT A. LEITZMAN, OF CLAYTON, INDIANA.

RESILIENT WHEEL.

1,077,612.   Specification of Letters Patent.   Patented Nov. 4, 1913.

Application filed July 25, 1912. Serial No. 711,420.

*To all whom it may concern:*

Be it known that I, GILBERT A. LEITZMAN, a citizen of the United States, residing at Clayton, county of Hendricks, and State of Indiana, have invented certain new and useful Improvements in Resilient Wheels, of which the following is a specification.

My invention relates to wheels and particularly to that class thereof known as resilient wheels.

The object of my invention is to provide an improved wheel of the class mentioned which shall be characterized by the proper amount of resiliency without necessitating the employment of pneumatic tires and which shall be strong and durable.

In carrying out my invention I provide a hub, a rim and a plurality of telescopic spokes connecting the same, said spokes being crossed in pairs to equalize the torsional strain between the hub and rim.

A further object of my invention is to provide in a wheel characterized as stated, an arrangement whereby the crossed spokes shall not interfere with each other.

Other objects will appear hereinafter.

With these objects in view my invention consists generally in a hub provided with end flanges and a pair of annular plates secured to each flange, the flanges and plates being provided with registering recesses forming a series of staggered pockets for the reception of the inner ends of the spokes.

My invention further consists of various details of construction and arrangements of parts all as will be fully described hereinafter and particularly pointed out in the claims.

My invention will be more readily understood by reference to the accompanying drawings forming a part of this specification and in which—

Figure 1 is an elevation of a wheel embodying my invention in its preferred form one of the spokes being shown in section, Fig. 2 is a section on the line x—x of Fig. 1 and illustrated upon an enlarged scale, Fig. 3 is an end elevation of the hub, upon an enlarged scale and portions of the anular plates being broken away, and Fig. 4 is a side elevation of the hub with the central portion thereof broken away.

Referring now to the drawings 1 indicates the hub of the wheel and 2 the rim. The latter may be of any preferred construction but is preferably channeled as illustrated to receive a cushion tire 3. The hub 1 is provided at its ends with annular flanges 4 which are preferably integral therewith and which are reflexed or bent inwardly to converge toward the center of the rim. Secured to the flanges 4 are annular plates 5 and 6 which are arranged one upon the other as illustrated and held in position by a plurality of bolts 7. The hub flanges 4 are provided on their outer faces with recesses 8 and the plates 5 are provided with similar recesses 9 on their inner faces which register with the recesses 8 forming a series of spaced pockets 10 to receive the inner ends of the spokes. The outer faces of the plates 5 and the adjacent faces of the plate 6 are formed with similar recesses 11 and 12 forming similar pockets 13 which are in staggered relation to the pockets 10 as shown clearly in Fig. 4.

14 indicates the spokes. The pockets are tapered or outwardly flared to permit necessary circumferential movement of the spokes and the inner ends of the pockets are shaped to form sockets 15 to receive balls 16 on the inner ends of the spokes.

The rim 2 is provided with a plurality of socket members 17 which correspond in numbers to the number of spokes and which are arranged at regular intervals around the rim as indicated in Fig. 1. The spokes are provided at their outer ends with balls 18 fitting within the socket members 17.

Each spoke is formed of two telescopic portions 19 and 20, the former constituting the inner or hub end of the spoke and the latter the outer end. The outer portion or end 20 is tubular and is adapted to receive the inner end portion 19, and arranged within the portion 20 is a spring 21 impinging against the end of the rod 19. The spokes are arranged in groups of four, and every second spoke at the rim extends to the opposite end of the hub from the intermediate spokes. The two innermost spokes of each group cross and extend to the outer pockets 13 at opposite ends of the spoke, and the outermost spokes of each group also cross their own inner ends and the inner ends of the inner spokes and extend to the inner pockets 10 at the opposite ends of the spokes. By this arrangement the spokes which cross at the large portions 20 are at the greatest distance from each other and those which cross at points of greater proximity do so at the portions 19 of the spokes which are of less diameter, thereby all contact between the several spokes is avoided. It is obvious, that to maintain the proper angular relation of the several spokes to avoid contact, when the hub is shortened, the flanges 4 and plates 5 and 6 must be increased in diameter to bring the pockets 10 and 13 closer to the rim. By making the plates 5 and 6 of annular form a recess 22 is provided at the inner side of the hub for the shoulder or collar 23 to bear directly against the hub, and a similar recess 24 for the dust guard 25 and nut 26.

Having described my invention what I claim as new and desire to secure by Letters Patent is:—

1. A wheel comprising a rim, a plurality of spokes, the outer ends of said spokes being connected at intervals to said rim, a hub provided with a series of spaced staggered pockets at each end to receive the inner ends of said spokes, said spokes being arranged in groups of four, the innermost spokes of each group extending to the outermost pockets at the opposite ends of the hub and the outermost spokes extending to the innermost pockets at the opposite ends of the hub, substantially as described.

2. A wheel comprising a rim, a plurality of spokes, connected at their outer ends at intervals to said rim, each of said spokes comprising a tubular outer portion and a telescopic inner portion and a spring arranged in said tubular portion, a hub provided with a series of spaced staggered pockets at each end to receive the inner ends of said spokes, said spokes being arranged in groups of four, the innermost spokes of each group extending to the outermost pockets at the opposite ends of the hub and the innermost spokes extending to the innermost pockets at the opposite ends of the hub, substantially as described.

3. In a wheel, a hub provided with annular flanges, an annular plate secured to each of said flanges, the adjacent faces of said flanges and said plate being provided with a series of registering recesses together forming pockets, the inner ends of said pockets being spherical and the outer portion being flared circumferentially and spokes having balls on their inner ends arranged in the spherical portions of said pockets, and the side walls of said flared portion being parallel and spaced apart a distance substantially equal to the diameter of the adjacent portion of the spoke, substantially as described.

4. In a wheel, a hub provided with a pair of annular flanges, a pair of annular plates secured one upon the other to each of said flanges, the adjacent faces of said flanges and abutting plates and the adjacent faces of the plates being provided with a series of registering recesses forming a series of staggered pockets at each end of said hub, and spokes having their ends arranged in said pockets, substantially as described.

In testimony whereof I have signed my name to this specification in the presence of two subscribing witnesses.

GILBERT A. LEITZMAN.

Witnesses:
W. H. WILLS,
P. R. MARTIN.